US012644955B1

(12) United States Patent
Lutsky

(10) Patent No.: US 12,644,955 B1
(45) Date of Patent: Jun. 2, 2026

(54) SYSTEM AND METHOD FOR ENVIRONMENTAL SENSING WITH RADIO FREQUENCY-EQUIPPED DEVICES

(71) Applicant: TEOM Inc., Scottsdale, AZ (US)

(72) Inventor: Vitaly Lutsky, Jerusalem (IL)

(73) Assignee: TEOM Inc., Scottsdale, AZ (US)

( * ) Notice: Subject to any disclaimer, the term of this patent is extended or adjusted under 35 U.S.C. 154(b) by 0 days.

(21) Appl. No.: 19/236,730

(22) Filed: Jun. 12, 2025

(51) Int. Cl.
| | |
|---|---|
| *G01S 5/02* | (2010.01) |
| *H04B 17/364* | (2015.01) |
| *H04L 25/02* | (2006.01) |
| *H04W 4/33* | (2018.01) |

(52) U.S. Cl.
CPC .......... *G01S 5/0273* (2013.01); *H04B 17/364* (2015.01); *H04L 25/0202* (2013.01); *H04W 4/33* (2018.02)

(58) Field of Classification Search
CPC ...... G01S 5/0273; H04W 4/33; H04B 17/364; H04L 25/0202
See application file for complete search history.

(56) References Cited

U.S. PATENT DOCUMENTS

| | | | |
|---|---|---|---|
| 10,416,274 B2 * | 9/2019 | Alexander ............ | G01S 5/0273 |
| 2017/0212210 A1 * | 7/2017 | Chen ......................... | G01S 5/06 |

FOREIGN PATENT DOCUMENTS

| | | | | |
|---|---|---|---|---|
| WO | WO-2025131404 A1 * | 6/2025 | ........... | G01S 13/878 |

* cited by examiner

*Primary Examiner* — Cassi J Galt
(74) *Attorney, Agent, or Firm* — Cozen O'Connor

(57) ABSTRACT

A radio-determined environment sensing system includes: (a) a first transmitter configured to transmit a pilot radio signal; (b) at least one receiver configured to receive a mixture of signals including the pilot signal and reflections thereof; and (c) at least one control unit configured to receive the mixture of signals from the UE modules and process them to generate channel estimates and therefrom to extract the taps contained. The first transmitter and the at least one receiver are static over a certain time period. The control unit is configured to operate a processing procedure to generate at least one power delay profile (PDP) tap from the channel estimate, and evaluate changes in the environment from information contained in a calculated measurement vector $z_k$.

25 Claims, 5 Drawing Sheets

Path loss (dB)

50
55
60
65
70
75
80
85
90
95
100
105
110
115
120

Path loss (dB)

50
55
60
65
70
75
80
85
90
95
100
105
110
115
120

Path loss (dB)

SYSTEM AND METHOD FOR ENVIRONMENTAL SENSING WITH RADIO FREQUENCY-EQUIPPED DEVICES

FIELD OF INVENTION

The present invention relates in general to radio frequency devices, and in particular to systems and methods for environmental sensing using multiple radio frequency units.

BACKGROUND OF INVENTION

Devices configured to transmit and receive digital communications through radio frequencies are well established in a number of applications, from mobile phones to remote control devices, to industrial equipment in factories or warehouses. In each of these applications, information relating to both the position of the device and its environment is highly useful. For example, up-to-date information relating to the position of multiple forklifts within a factory is vital to maintaining the safety of the equipment and their operators, as is up-to-date information relating to the environment in which those forklifts are operating.

Systems and methods to visually monitor environments and extract information relating to changes therein often require significant capital investments in new technology. These requirements complicate the operation of commercial and industrial spaces, and in most cases ensure the adoption of such technologies is effectively cost-prohibitive. Additionally, a period of installation defines the adoption of these technologies, thereby preventing safe operation of spaces. Technologies for the monitoring of such environments may include traditional visual technologies such as CCTV with appropriate software for element extraction, or more advanced technologies such as LIDAR or stereoscopic visual operation.

In response to the high costs associated with these highly specialized visual monitoring systems, several approaches have attempted to repurpose or retrofit existing infrastructure with more affordable optical sensors. These include the strategic placement of passive or active optical elements-such as photodiodes, infrared reflectors, or low-resolution cameras-on pre-existing lighting systems, electrical conduits, or structural supports. In theory, this enables environmental monitoring without requiring the complete overhaul or reconfiguration of the monitored space. For instance, factory lighting systems may be fitted with downward-facing optical sensors to detect human or vehicle motion, while camera arrays can be positioned on ceiling mounts to analyze crowd density or object displacement.

However, whilst these techniques offer partial relief from the high cost of infrastructure replacement, they still require a non-trivial investment in sensor hardware and in the physical labor required to install and calibrate those sensors. Moreover, these optical systems often suffer from occlusion and line-of-sight limitations, particularly in cluttered industrial environments where shelving units, equipment, or moving personnel obstruct direct views. Lighting conditions may also introduce variability in sensor performance, reducing accuracy under fluctuating ambient light or in low-visibility scenarios such as dust-heavy manufacturing lines. As such, even when these solutions are deployed, they rarely offer a comprehensive or robust picture of environmental change without complex and costly redundancy in sensor placement.

Due to these physical and economic constraints, significant interest has shifted toward utilizing already-present electromagnetic signals—particularly radio frequency (RF) transmissions—as a passive, non-invasive means of deducing positional and environmental information. Communication signals, such as those used in 4G, 5G, Wi-Fi, or Bluetooth protocols, inherently interact with the environment, undergoing reflection, diffraction, and absorption as they propagate through space. These signal alterations encode rich spatial and environmental information that, in theory, can be extracted and analyzed to map both static and dynamic changes in a monitored environment.

To that end, standardized radio procedures such as Sounding Reference Signals (SRS) in 5G networks are particularly promising. SRS transmissions are designed to allow a receiver or base station to assess the radio channel quality in different spatial directions and frequencies. By analyzing SRS reflections and their temporal and spectral characteristics, it becomes possible to infer spatial occupancy, detect motion, and even identify material properties within a given space. This capability presents an attractive alternative to visual monitoring, especially in settings where line-of-sight is unreliable or where privacy considerations preclude video surveillance.

Yet despite this potential, existing RF-based environmental mapping systems remain largely limited in their commercial applicability. The critical issue is not the hardware, which is often already deployed as part of standard wireless communication infrastructure, but in analysis and interpretation of the data to generate reliable and safe environmental sensing. Transforming raw RF signal changes into coherent, interpretable representations of environmental dynamics is simply not possible with the systems and methods currently taught in the art, as demonstrated by the lack of any such commercial system. Multipath effects, interference, and signal noise introduce considerable ambiguity into the raw data, requiring sophisticated statistical and machine learning models to extract meaningful information. Furthermore, most existing systems are designed with communication throughput in mind, not environmental sensing, and thus lack the calibration or data resolution necessary for fine-grained analysis.

Thus, a need exists within the industry for a system and method capable of accurately and reliably sensing changes in an environment using only the radio frequency transmissions of already widespread conventional radio units.

SUMMARY OF INVENTION

The following embodiments and aspects thereof are described and illustrated in conjunction with systems, devices and methods which are meant to be exemplary and illustrative and not limiting in scope. In various embodiments, one or more of the above-described problems have been reduced or eliminated, while other embodiments are directed to other advantages or improvements.

According to a first aspect of the present invention, a radio-determined environment sensing system comprises: (a) a first transmitter configured to transmit a pilot radio signal, wherein said first UE module is static over a certain time period; (b) at least one receiver configured to receive a mixture of signals including the said pilot signal and reflections thereof, wherein said at least one second UE module is static over a certain time period; and (c) at least one control unit configured to receive the said mixture of signals from the UE modules and process them to generate channel estimates and therefrom to extract the taps contained, wherein each channel estimate contains at least the information relating to: the tap delay; the power of the tap; the angle of arrival at the at least one receiver, wherein the transmitter and at least one receiver is time-synchronized with each other, wherein the control unit is configured to operate a processing procedure to generate at least one power delay profile (PDP) tap from the channel estimate, wherein said processing procedure: defines a state vector $x_k$; employs a constant velocity model on xx to find the state transition $x_{k+1}$; and generates from $x_{k+1}$ a measurement vector $z_k$, and wherein the control unit is configured to evaluate changes in the environment from information contained in the measurement vector $z_k$.

According to another aspect of the present invention, the state vector x contains information relating to: the tap delay $\tau$; the complex powers for the at least one receiver P; the rate of change of delay $\dot{\tau}$; the rates of change for the real components of the complex powers Re(P); and the rates of change for the imaginary components of the complex powers Im(P).

According to another aspect of the present invention, the constant velocity model applies a time step $\Delta t$ is applied to the components of the state vector $x_k$ and adds a process noise function $w_k$ which relates to multivariate normal distribution with a mean vector of 0 and a covariance Q.

According to another aspect of the present invention, the measurement vector $z_k$ is linear with respect to the state vector $x_k$, and wherein gradient of $x_k$ in $z_k$ is the matrix $[I_{n \times n} \ 0_{n \times n}]$; and the z intercept in $z_k$ is measurement noise function $v_k$ which relates to multivariate normal distribution with a mean vector of 0 and a covariance R.

According to another aspect of the present invention, n is equivalent to between 2 and 6, and preferably 3.

According to another aspect of the present invention, the at least one control unit is configured to simultaneously assign the taps to tracks and process said tracks by applying a cost matrix function $C_{(i,j)}$ for measurements i and tracks j to associate and weight data, and then optimally assigns measurements i to tracks j by minimizing assignment cost.

According to another aspect of the present invention, the optimal assignment is operated by the control module by operating the Hungarian algorithm.

According to another aspect of the present invention, the at least one control unit is configured to initiate new tracks by: creating a tentative track for each unassigned tap; generating an initial state vector $x_{initial}$ with no velocity; setting an initial covariance matrix on the initial state vector $x_{initial}$, counting detected increments each time a new tap is associated with the tentative track; transform the tentative track to a confirmed track when the detection count surpasses a set threshold.

According to another aspect of the present invention, the at least one control unit is configured to maintain existing tracks by: adding increments to an age counter associated with each track when no tap is assigned; resetting the age counter to 0 when a tap is assigned; and deleting the track of age counter exceed a set track age threshold $A_{max}$.

According to another aspect of the present invention, the at least one control unit is configured to operate an Unscented Kalman Filter (UKF) to the PDPs to capture the means and covariance of the state probability distribution of at least one state vector $x_k$, wherein the resultant mean and covariance are weighted, and then to operate a prediction; before ultimately calculating a Kalman gain $K_{k+1}$ utilizable to generate an updated state estimate $\hat{x}_{k+1|k+1}$ and the covariance $P_{k+1|k+1}$.

According to another aspect of the present invention, the at least one control unit operates the UKF with parameters: (a) a state dimension n of between 5 and 50; (b) a measurement dimension m of between 2 and 8; (c) spread of sigma points $\alpha$ of between $10^{-2}$ and $10^{-5}$; (d) prior knowledge of distribution $\beta$ of between 1.5 and 3.5; (e) secondary scaling parameter $\kappa$ equivalent to 0; (f) a composite scaling parameter $\lambda$ equivalent to $\alpha^2$ (n+$\kappa$)−n.

According to another aspect of the present invention, the at least one control unit operates the weighting of the initial mean $$W_m^0$$

using a mathematical combination of the composite scaling parameter $\lambda$ and the state dimension n.

According to another aspect of the present invention, the at least one control unit operates the weighting of the initial covariance $$W_c^0$$

using a mathematical combination of the composite scaling parameter $\lambda$ and the state dimension n and the spread of sigma points $\alpha$ and prior knowledge of distribution $\beta$.

According to another aspect of the present invention, the at least one control unit operates the prediction by: propagating sigma points through the state transition function; calculating the predicted state mean $\hat{x}_{k+1|k}$; and then calculating the predicted state variance $P_{k+1|k}$.

According to another aspect of the present invention, the Kalman gain $K_{k+1}$ is calculated from a combination of a cross correlation matrix $P_{xz}$ and an innovation covariance $P_{zz}$, both terms themselves calculated from a propagation of sigma points generated in the prediction through the measurement function.

According to another aspect of the present invention, the at least one control unit is configured to apply a pre-process to the PDPs before further processing.

According to another aspect of the present invention, at least one control unit is configured to operate a pre-process wherein valid measurements are identified according to the presence of NaN delay values.

According to another aspect of the present invention, at least one control unit is configured to calculate power for each tap from the raw data received and generate therefrom decibel (dB) values.

According to another aspect of the present invention, at least one control unit is configured to filter out taps below a set threshold $P_{min}$.

According to another aspect of the present invention, $P_{min}$ is between −14 and −7 dB, wherein 0 dB is defined by the control unit as the baseline noise level of the receiver.

According to another aspect of the present invention, the at least one control unit is a plurality of control units associated with a plurality of receivers.

According to another aspect of the present invention, each receiver is installed with its own control unit, and wherein data from part or all of the plurality of control units is combined periodically and processed.

According to another aspect of the present invention, the transmitter is also configured to receive signals.

According to another aspect of the present invention, the at least one receiver is configured to transmit signals.

According to another aspect of the present invention, the at least one control unit determines tap delay and tap power change vs. baseline delay and power as a function of electromagnetic diffusion speed difference in different materials.

According to another aspect of the present invention, the at least one control unit determines noise profile change with respect to baseline delay and power of at least one tap in order to evaluate interfering object movement properties.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention.

Figure 1A:
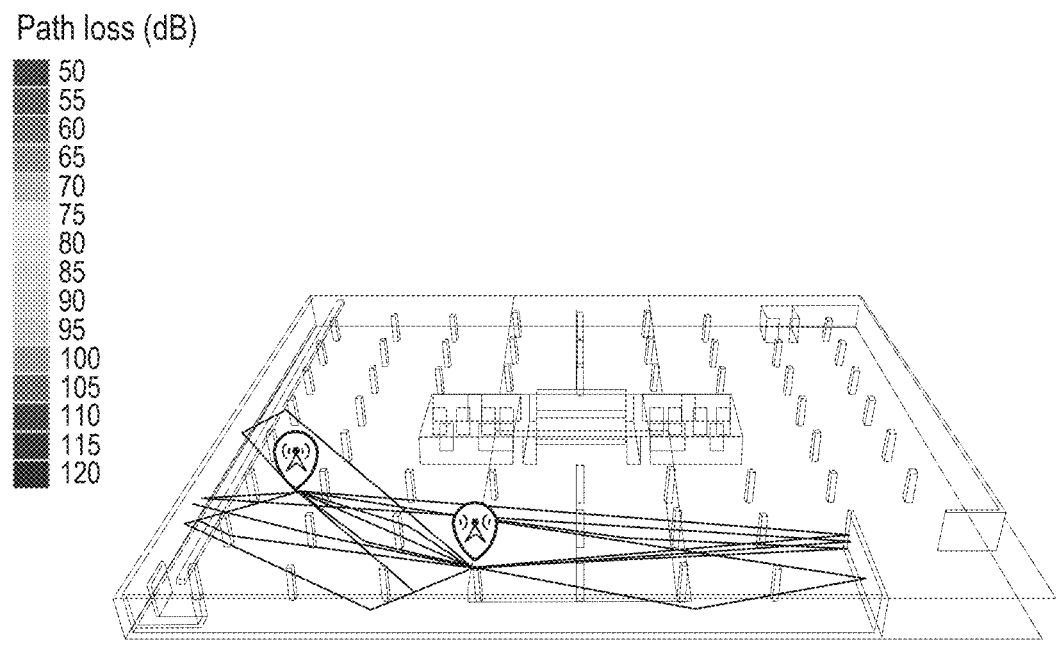
Figure 1B:
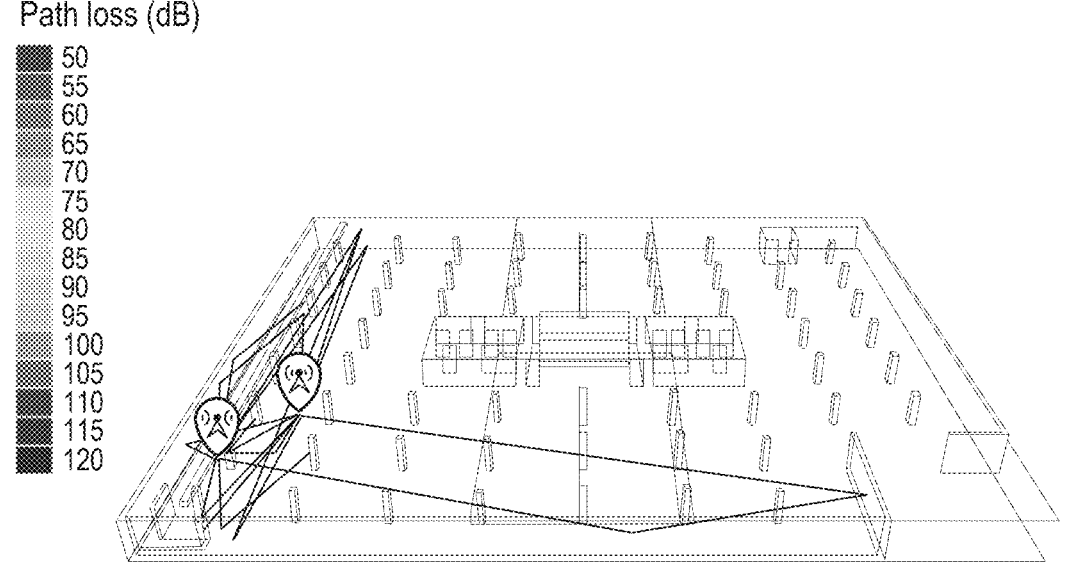
Figure 1C:
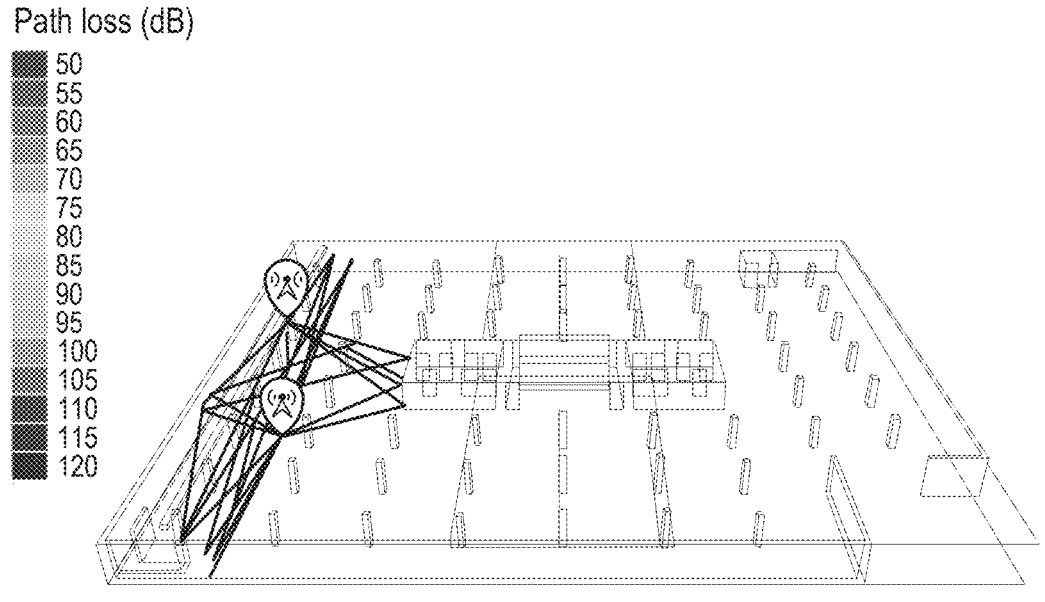

IN THE FIGURES:

FIG. 1A-1C constitutes three overviews of an industrial environment in which a static and mobile UE equipped with RUs (radio units) of the present invention are disposed, according to some embodiments.

Figure 2:
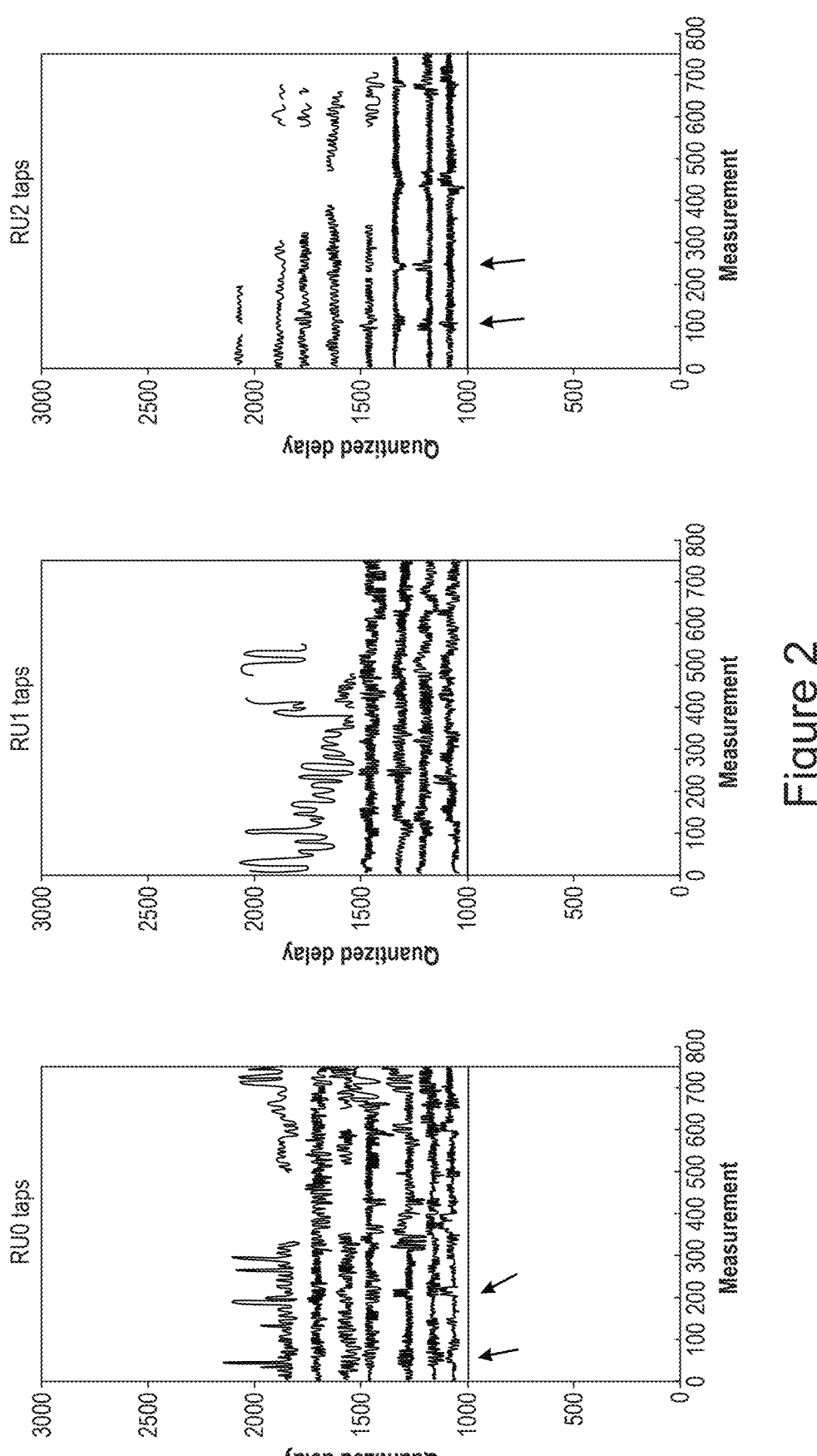

FIG. 2 constitutes three graphs indicating tap delay data from the UEs shown in FIG. 1, wherein movements of an object is sensed, according to some embodiments.

Figure 3:
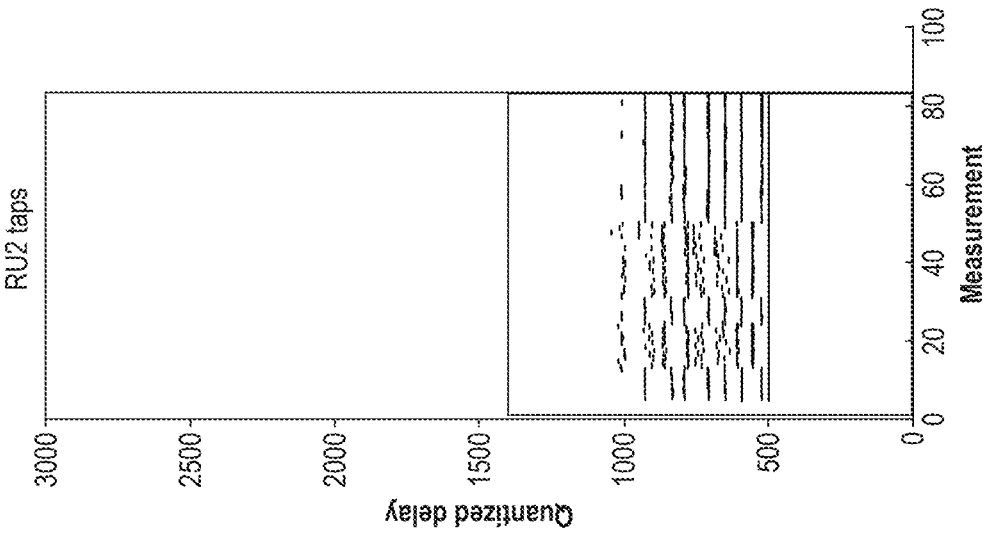
Figure 3:
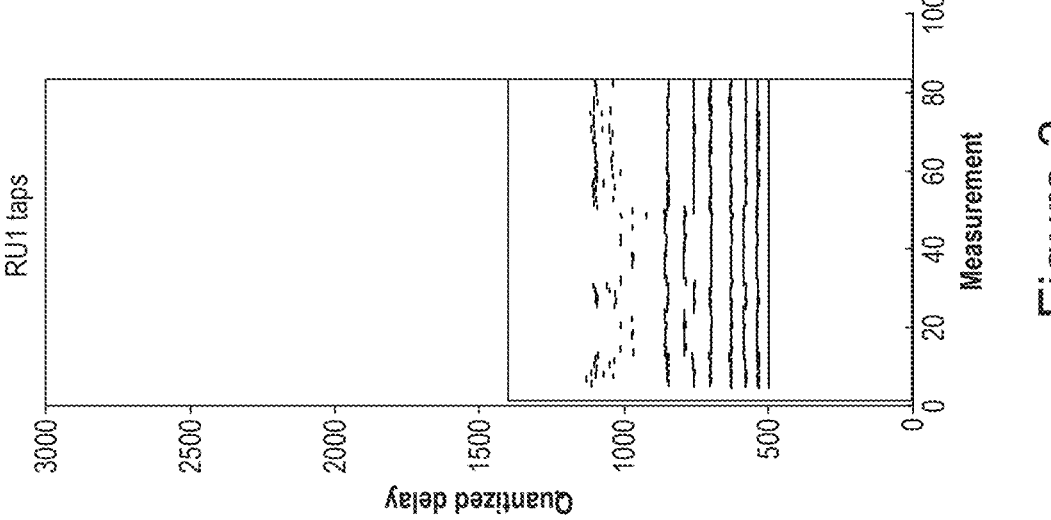
Figure 3:
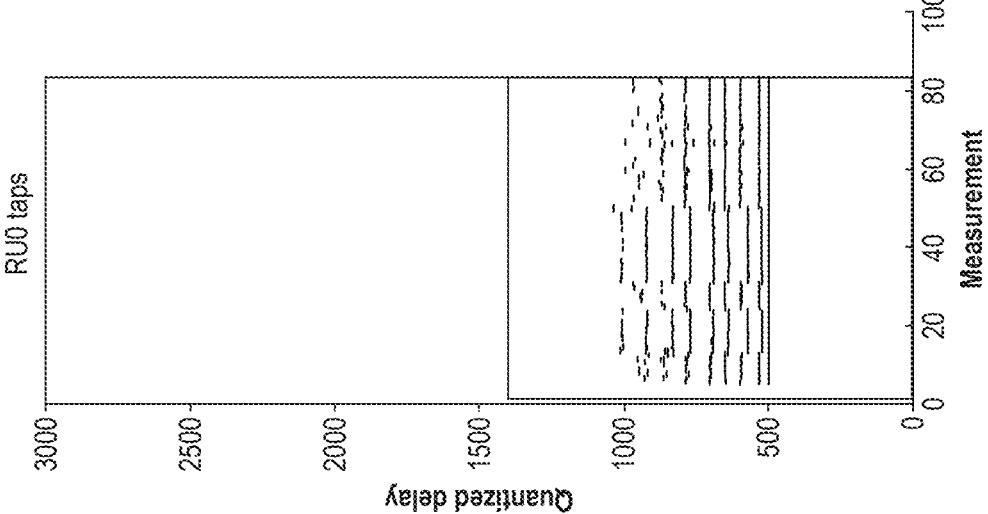

FIG. 3 constitutes three graphs indicating tap delay data from the UEs shown in FIG. 1, wherein blockages between UEs are sensed, according to some embodiments.

Figure 4:
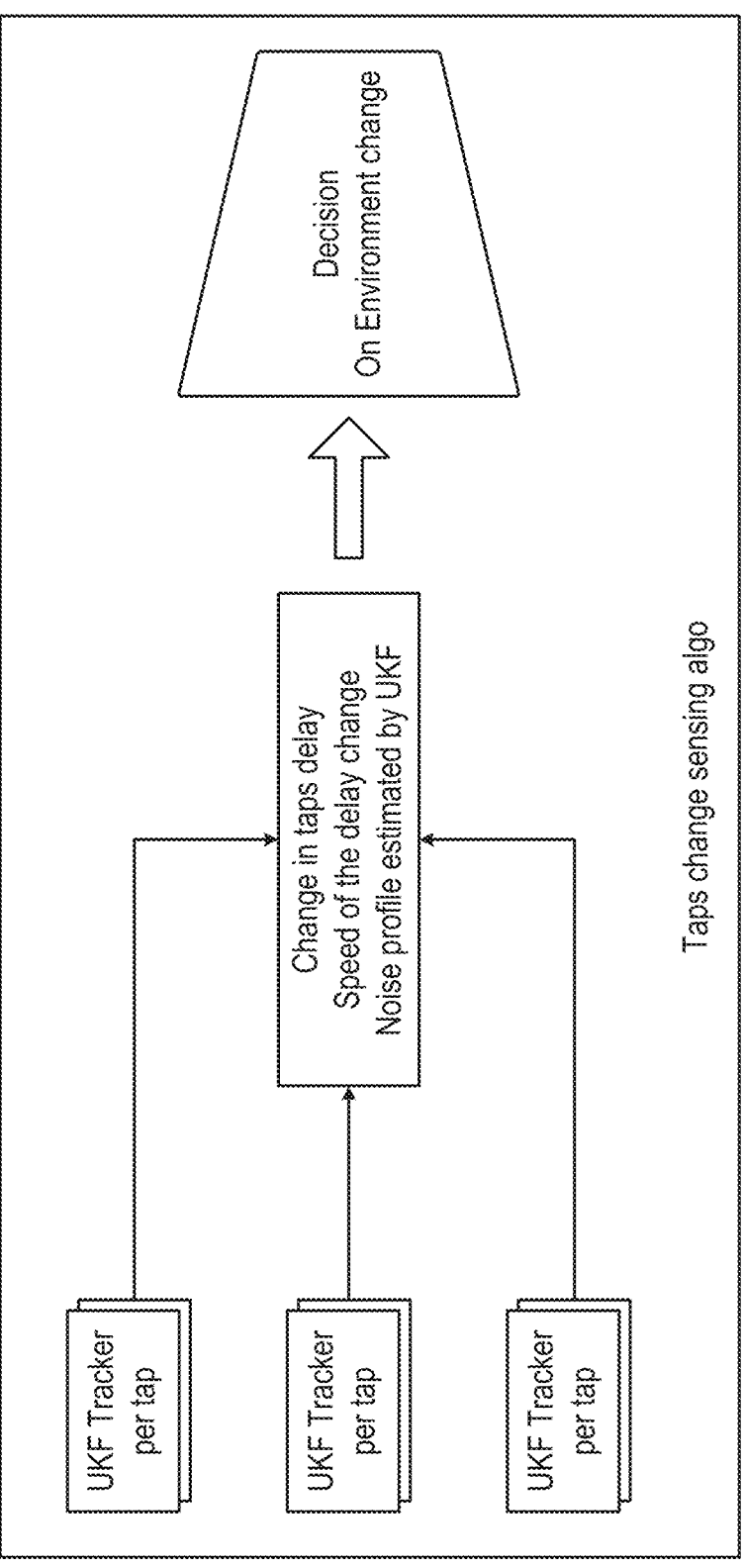

FIG. 4. Constitutes a block diagram of the data processing of the at least one control unit of the present invention, according to some embodiments.

DETAILED DESCRIPTION OF SOME EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Unless explicitly stated, the method embodiments described herein are not constrained to a particular order or sequence. Additionally, some of the described method embodiments or elements thereof can occur or be performed simultaneously, at the same point in time, or concurrently.

It is an object of the present invention to provide capability to determine changes in an environment using the data from at least two radio frequency devices. The data relating to the receiving and transmitting of these frequency between said devices is highly valuable, albeit requiring special knowledge taught herein to glean important information. It is also an object of the present invention to utilize the characteristics of the noise present in said data to further characterize the differences in the environment.

Possible industrial applications of the knowledge taught herein may include: environmental monitoring in industrial or manufacturing spaces, real-time tracking of human and machine movement in automated warehouses, and infrastructure integrity monitoring in public or private facilities. In each of these environments, conventional visual sensing systems may be impractical due to cost, occlusion, lighting conditions, or data privacy considerations. The use of radio frequency (RF) signal analysis—including both signal and complementary noise profiles—allows for continuous, passive environmental awareness with minimal hardware deployment.

In smart factories, the capability to detect changes in power delay profiles (PDPs) between two or more RF devices may be used to determine the presence of newly introduced machinery or the movement of equipment with high spatial accuracy. For instance, the sudden appearance of a strong reflection tap may suggest a metallic object has entered the line of sight between RF devices, while a gradual shift may indicate displacement of existing infrastructure.

In transportation hubs such as airports or rail terminals, the ability to estimate speed and direction of moving individuals or vehicles by analyzing Doppler-induced changes in tap delays offers an efficient, non-invasive method for traffic monitoring, flow optimization, and security screening. Importantly, these methods can operate without requiring direct interaction with the tracked object, unlike GPS or Bluetooth-based systems.

In environments with variable material compositions—such as warehouses storing a combination of metal, fabric, wood, and glass products—the present invention enables material classification based on electromagnetic reflection and scattering characteristics. This may assist inventory systems by correlating observed RF signal patterns with material presence or absence, reducing reliance on manual scanning or barcoding.

Environmental mapping using tap analysis enables reconstruction of spatial topologies for augmented reality (AR), robotic navigation, and digital twin generation. These applications benefit from the continuous and dynamic mapping capabilities taught herein, particularly in environments where change detection is critical.

The system and method taught in the present invention teaches a means of sensing changes in an environment, when said changes are caused by the movements or repositioning of non-radiating/reflecting/absorbing objects, by observing changes in power delay profiles (PDPs) from the receiver's side of a communication pair (i.e. a transmitter and a receiver). According to some embodiments, the communication pair communicate by utilizing wireless technology (5G, WiFi, etc.), whilst a control module operates an estimation by examining the change of PDP profile against a baseline PDP profile, wherein said control module applies a UKF with specific parameters to each tap in PDP for each received data point estimated for each transmitter and receiver pair. According to some embodiments, the change in PDP can be classified as sensing results of several types: (a) change of the tap delay and power caused by diffraction speed of EM radiation in different materials; (b) noise calculated by observed delay and power vs baseline tracked delay and power (can be used for movement properties estimation of interfering object); or tap "disappearance" for period of time relating to a reflection blockage.

In the present invention, a number of mathematical terms are taught as part of the process operated by the control module:

k—Tracker iteration time (observation number)

$x_k$—state vector related to one PDP tap information at the iteration k

7 i,j—indexes of the UKFs tracking taps, wherein $tap_i$ and $tap_j$ each has it's own UKF tracker and state vector x.

The term "radio frequency" as used herein, refers to the range of electromagnetic frequencies typically between 3 kilohertz (kHz) and 300 gigahertz (GHz), which are used for wireless transmission of signals in various communication systems, including but not limited to mobile phones, satellite transceivers, Wi-Fi routers, Bluetooth devices, RFID tags, near-field communication (NFC) systems, and industrial telemetry units. Radio frequency communication may operate in accordance with a plurality of standardized protocols, including but not limited to IEEE 802.11 (Wi-Fi), Bluetooth (IEEE 802.15.1), Long-Term Evolution (LTE), 5G New Radio (5G NR, as specified by 3GPP Release 15 and later), Zigbee (IEEE 802.15.4), and Global System for Mobile Communications (GSM). The term encompasses both licensed and unlicensed frequency bands and includes signal propagation in free space or through guided media such as coaxial cable or waveguide structures, as applicable.

The term "tap delay" as used herein, refers to a discrete time offset applied to an individual component of a multipath signal in the modeling or implementation of a communication channel, particularly within the context of finite impulse response (FIR) filters or channel impulse response models in wireless systems. Tap delays are used to represent the time-dispersed reflections or replicas of a transmitted signal arriving at a receiver due to environmental scattering, reflection, diffraction, or refraction. Each tap in the model corresponds to a signal path with a specific delay and often an associated attenuation or phase shift, and the overall collection of tap delays characterizes the temporal and spatial behavior of a radio frequency channel. Tap delay modeling/analysis is fundamental to the analysis and simulation of channels in systems compliant with standards such as 5G NR (3GPP TS 38.101), LTE (3GPP TS 36.101), and IEEE 802.11ax (Wi-Fi 6), among others.

The term "tap" as used herein, refers to an instance of a received pilot signal at a receiver, that has the parameters: delay TAU; and power P. A mixture of signals may be received by a receiver, said mixture containing a number of taps, albeit in its raw form said taps are not directly extractable. The generation of a channel estimate from said raw form is established knowledge of the art. The system of the present invention can generate from the channel estimate information relating to the taps contained therein, and the parameters thereof.

The term "environment", as used herein, refers to the three-dimensional physical space in which the system of the present invention is disposed.

The term "user equipment", as used herein, refers to a tool or assembly of tools for use by a user. The subject matter of the present invention relates to equipment with the capacity for communications using radio frequency as defined above. For example, UEs may refer to: general radio equipment; radio transceivers; mobile phones; smartphones; tablets; wearable devices such as smartwatches; laptops with wireless capabilities; or any other portable or stationary devices configured to send and receive signals via one or more radio frequency bands. The term also encompasses embedded systems within vehicles, machinery, or consumer electronics that communicate wirelessly. In accordance with the present invention, the user equipment may include hardware and/or software components configured to facilitate such communication, including antennas, baseband processors, and protocol stacks. Furthermore, the user equipment may support multiple radio access technologies and may be adapted for use in various environments including indoor, outdoor, terrestrial, and aerial communication scenarios.

Reference is made to FIG. 1, which constitutes three overviews of an industrial environment in which a static and mobile UE equipped with RUs of the present invention are disposed, according to some embodiments. The first UE is a mobile piece of equipment, for example a forklift or warehouse robot, and the second UE is a static equipment, for example a packing machine or other heavy static machinery.

In FIG. 1A, the first UE is in the portion of the environment closest to the viewer, wherein the majority of the transmissions include a reflection and a path loss value (dB) between 95 and 110. Some shorter transmissions between the two UEs are in the range of 75 dB and 95 dB, and a single uninterrupted transmission with a path loss of 70 dB connects the two UEs. In FIG. 1B, the first UE is in the lefthand portion of the environment from the perspective of the viewer, and closer to the static UE than in FIG. 1A, thus exhibiting a number of much shorter transmissions with a path loss of under 65 dB. In FIG. 1C, the first UE is in the lefthand portion towards the rear of the environment from the perspective of the viewer, thus further away from the static UE than the FIG. 1B but closer than FIG. 1A, thus exhibiting an intermediate range of path loss transmission. According to some embodiments, the first UEs shown in FIG. 1A-C are all different UEs communicating with the static UE simultaneously.

According to some embodiments of the present invention, the angles, powers, and delay times associated with every transmission can be used—when the positioning of the UEs and the layout of the environment is known—to sense changes in said environment.

Reference is made to FIG. 2, which constitutes three graphs indicating tap delay data from the UEs shown in FIG. 1, wherein movements of an object is sensed, according to some embodiments. The intermediary jumps in the tap delay measurements shown by arrows in left and right graphs relate to movements of an object passing in the environment close to the closest line of transmission between the first and second UEs. When the first UEs shown in FIG. 1A-C are all different UEs communicating with the static UE simultaneously, the timestamp associated with the deviations in tap delay data can be synchronized to confirm that the environment changed at that time point.

Reference is made to FIG. 3, which constitutes three graphs indicating tap delay data from the UEs shown in FIG. 1, wherein blockages between UEs are sensed, according to some embodiments. When the tap delay is decreased for the same track, the present invention can determine that a block to a reflection has been sensed, said reflection block producing a shorter time delay by reducing the distance of the transmission to the first point of reflection, for example a wall. When the first UEs shown in FIG. 1A-C are all different UEs communicating with the static UE simultaneously, the timestamp associated with the deviations in tap delay data can be synchronized to confirm that the environment changed at that time point.

According to some embodiments of the present invention, a state vector $x_k$ for each tap delay is defined with the following matrix:

$$x = \begin{bmatrix} \tau \\ Re(P) \\ Im(P) \\ \dot{\tau} \\ \dot{Re}(P) \\ \dot{Im}(P) \end{bmatrix}$$

Wherein: $\tau$ is the tap delay; P is complex power of the tap; t is the rate of change of delay; Re(P), Im(P) are the rate of change for the real and imaginary components of the complex power of the received tap;

According to some embodiments, a constant velocity model is applied by the at least one control unit to the state transition $x_k$ for each tap delay.

$$x_{k+1} = f(x_k) = \begin{bmatrix} \tau_k + \Delta t \cdot \dot{t}_k \\ Re(P)_k + \Delta t \cdot Re(P)_k \\ Im(P)_k + \Delta t \cdot Im(P)_k \\ \dot{t}_k \\ \dot{Re}(P)_k \\ \dot{Im}(P)_k \end{bmatrix} + w_k$$

Wherein: $\Delta t$ is the time step between measurements; $w_k$ is the process noise, and wherein said process noise $w_k \sim \mathcal{N}(0, Q)$, wherein Q is the covariance.

According to some embodiments of the present invention, the measurement vector z is defined:

$$z = \begin{bmatrix} \tau \\ Re(P) \\ Im(P) \end{bmatrix}$$

Wherein the measurement model is linear with respect to the state:

$$z_k = h(x_k) = HX_k + v_k$$

Wherein: $H = [I_{3 \times 3} \ 0_{3 \times 3}]$ is the measurement matrix; $v_k$ is the measurement noise, wherein said measurement noise $v_k \sim \mathcal{N}(0, R)$ wherein R is the covariance.

Unscented Kalman Filters (UKFs) are well known in the art, but their application in the present invention relies on a careful tuning of the parameters to achieve data analysis results that can be utilized in industry for accurate and reliable sensing of the changes to an environment.

The UKF tuning of the present invention can aptly handle the nonlinearities of the data and noise associated therewith to provide accurate state estimation. By employing a deterministic sampling approach to capture the mean and covariance of the state probability distribution, the data gathered by the UEs of the present invention can be transformed into meaningful analysis relating to the changes to an environment.

According to some embodiments of the present invention, the UKF operated by the at least one control unit generates a set of 2n+1 sigma points $\mathcal{X}$ as follows:

$$\mathcal{X}_0 = \hat{x}$$
$$\mathcal{X}_i = \hat{x} + \sqrt{(n+\lambda)}[\sqrt{P}]_i \text{ for } i=1, \ldots, n$$
$$\mathcal{X}_{i+n} = \hat{x} - \sqrt{(n+\lambda)}[\sqrt{P}]_i \text{ for } i=1, \ldots, n$$

Wherein: $\hat{x}$ is the current state estimate; P is the state covariance matrix; and $[\sqrt{P}]_i$ denotes the i-th column of the matrix square root of P.

According to some embodiments of the present invention, the weights for the mean and covariance calculations for the UKF operated by the at least one control unit are:

$$W_m^0 = \frac{\lambda}{n + \lambda}$$

-continued $$W_c^0 = \frac{\lambda}{n + \lambda} + (1 - \alpha^2 + \beta)$$

$$W_m^i = W_c^i = \frac{1}{2(n + \lambda)} \text{ for } i = 1, \ldots, 2n$$

According to some embodiments of the present invention, the at least one control unit operates a UKF to generate sigma points $\mathcal{X}_k$ from the current state estimate $\hat{x}_{k|k}$ and covariance $P_{k|k}$ by first propagating sigma points through the state transition function:

$$\mathcal{Y}_{k+1|k,i} = f(\mathcal{X}_{k,i}) \text{ for } i=0, \ldots, 2n$$

From the resultant terms, then calculating the predicted state mean:

$$\hat{x}_{k+1|k} = \sum_{i=0}^{2n} W_m^i \mathcal{Y}_{k+1|k,i}$$

From the resultant terms, then calculating the predicted state covariance:

$$P_{k+1|k} = \sum_{i=0}^{2n} W_c^i (y_{k+1|k,i} - \hat{x}_{k+1|k})(\mathcal{Y}_{k+1|k,i} - \hat{x}_{k+1|k})^T + Q$$

According to some embodiments of the present invention, the at least one control unit generates sigma points $\mathcal{X}_{k+1|k}$ from the predicted state estimate $\hat{x}_{k+1|k}$ and covariance $P_{k+1|k}$ by first propagating sigma points through the measurement function:

$$\mathcal{Z}_{k+1|k,i} = h(\mathcal{X}_{k+1|k,i}) \text{ for } i=0, \ldots, 2n$$

From the resultant terms, then calculating the predicted measurement mean:

$$\hat{z}_{k+1|k} = \sum_{i=0}^{2n} W_m^i \mathcal{Z}_{k+1|k,i}$$

From the resultant terms, then calculating the innovation covariance:

$$P_{zz} = \sum_{i=0}^{2n} W_C^i (\mathcal{Z}_{k+1|k,i} - \hat{z}_{k+1|k})(\mathcal{Z}_{k+1|k,i} - \hat{z}_{k+1|k})^T + R$$

From the resultant terms, then calculating the cross-correlation matrix:

$$P_{xz} = \sum_{i=0}^{2n} W_c^i (\mathcal{X}_{k+1|k,i} - \hat{x}_{k+1|k})(\mathcal{Z}_{k+1|k,i} - \hat{z}_{k+1|k})^T$$

From the resultant terms, then calculating Kalman gain:

$$K_{k+1} = P_{xz} P_{zz}^{-1}$$

11

From the resultant terms, then updating the state estimate and covariance:

$$\hat{x}_{k+1|k+1}=\hat{x}_{k+1|k}+K_{k+1}(z_{k+1}-\hat{z}_{k+1|k})$$

$$P_{k+1|k+1} = P_{k+1|k} - K_{k+1}P_{zz}K_{k+1}^{T}$$

According to some embodiments of the present invention, to handle multiple delay taps simultaneously, comprehensive multitarget tracking framework is employed.

In order to associate data between measurements and existing tracks, the present invention according to some embodiments employs a cost matrix approach:

$$C(i,j)=\alpha\cdot|\tau_i-\hat{\tau}_j|+\beta\cdot\|P_i-\hat{P}_j\|$$

Wherein: $\tau_i$ is the delay of measurement; i–$\hat{\tau}_j$ is the predicted delay of track j; $P_i$ represents the complex powers of measurement i; $\hat{P}_j$ represents the predicted complex powers of track j; and $\alpha$ and $\beta$ are weighting constants.

According to some embodiments of the present invention, to optimally assign measurements to tracks, the control unit employs the Hungarian algorithm to minimize the total assignment cost:

$$\min_{A}\sum_{i=1}^{N_m}\sum_{j=1}^{N_t}A_{ij}C(i,j)$$

Wherein said algorithm is subject to:

$$-\sum_{j=1}^{N_t}A_{ij}\le 1 \text{ for all } i\in$$

$$\{1,\dots,N_m\}-\sum_{i=1}^{N_m}A_{ij}\le 1 \text{ for all } j\in\{1,\dots,N_t\}-A_{ij}\in\{0,1\}$$

for all i, j

Wherein: $N_m$ is the number of measurements; $N_t$ is the number of existing tracks; and $A_{ij}$ is a binary variable indicating assignment of measurement i to track j.

According to some embodiments of the present invention, before the control unit applies the UKF, a degree of pre-processing may be employed. For example, a pre-process may include the filtering out of low power taps by calculating the power of taps and applying the following formula to determine those taps below threshold $P_{min}$.

$$P_{dB}=10\log_{10}(|P|^2)$$

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. A radio-determined environment sensing system, comprising:

a. a first transmitter configured to transmit a pilot radio signal, wherein said first transmitter is static over a certain time period;

12 b. at least one receiver configured to receive a mixture of signals including the said pilot signal and reflections thereof, wherein said at least one receiver is static over a certain time period;

c. at least one control unit configured to receive the said mixture of signals from the first transmitter and at least one receiver and process them to generate channel estimates and therefrom to extract taps contained, wherein each channel estimate contains at least information relating to: tap delay; power of the tap; and angle of arrival at the at least one receiver;

wherein the transmitter and at least one receiver are time-synchronized with each other, wherein the control unit is configured to operate a processing procedure to generate, from at least one power delay profile (PDP) tap derived from a channel estimate: a state vector $x_k$ for each tap delay; a constant velocity model on the state vector $x_k$ to find a state transition $x_{k+1}$; and, from the state transition $x_{k+1}$, a measurement vector $z_k$, wherein the control unit is configured to evaluate changes in the environment from information contained in the measurement vector $z_k$, and wherein k is tracker iteration time.

2. The system of claim 1, wherein the state vector xx contains information relating to: the tap delay $\tau$; complex powers for the at least one receiver P; rate of change of delay $\tau$; rates of change for real components of the complex powers Re(P); and rates of change for imaginary components of the complex powers Im(P).

3. The system of claim 1, wherein the constant velocity model applies a time step $\Delta t$ to components of the state vector $x_k$ and adds a process noise function $w_k$ which relates to multivariate normal distribution with a mean vector of 0 and a covariance Q.

4. The system of claim 1, wherein the measurement vector $z_k$ is linear with respect to the state vector $x_k$, and wherein gradient of the state vector $x_k$ is a matrix $[I_{n\times n}\ 0_{n\times n}]$; and z intercept in the measurement vector $z_k$ is measurement noise function $v_k$ which relates to multivariate normal distribution with a mean vector of 0 and a covariance R.

5. The system of claim 4, wherein n is equivalent to one of between 2 and 6, inclusive.

6. The system of claim 1, wherein the at least one control unit is configured to simultaneously assign the taps to tracks and process said tracks by applying a cost matrix function $C_{(i,j)}$ for measurements i and tracks j to associate and weight data, and then optimally assigns measurements i to tracks j by minimizing assignment cost.

7. The system of claim 6, wherein the optimal assignment is operated by the at least one control unit by operating a Hungarian algorithm.

8. The system of claim 6, wherein the at least one control unit is configured to initiate new tracks by: creating a tentative track for each unassigned tap; generating an initial state vector $x_{initial}$ with no velocity; setting an initial covariance matrix on the initial state vector $x_{initial}$; counting detected increments each time a new tap is associated with the tentative track; transform the tentative track to a confirmed track when the detection count surpasses a set threshold.

9. The system of claim 6, wherein the at least one control unit is configured to maintain existing tracks by: adding increments to an age counter associated with each track when no tap is assigned; resetting the age counter to 0 when a tap is assigned; and deleting the track of age counter exceed a set track age threshold $A_{max}$.

10. The system of claim 1, wherein the at least one control unit is configured to operate an Unscented Kalman Filter (UKF) to capture mean and covariance of a state probability distribution of at least one state vector $x_k$, wherein the mean and covariance are weighted, and then to operate a prediction; before ultimately calculating a Kalman gain $K_{k+1}$ utilizable to generate an updated state estimate $\hat{x}_{k+1|k+1}$ and the covariance $P_{k+1|k+1}$.

11. The system of claim 10, wherein the at least one control unit operates the UKF with parameters:
  a. a state dimension n of between 5 and 50, inclusive;
  b. a measurement dimension m of between 2 and 8, inclusive;
  c. a spread parameter $\alpha$ used for generating sigma points, the parameter $\alpha$ being between $10^{-2}$ and $10^{-5}$, inclusive;
  d. prior knowledge of distribution $\beta$ of between 1.5 and 3.5, inclusive;
  e. secondary scaling parameter $\kappa$ equivalent to 0;
  f. a composite scaling parameter $\lambda$ equivalent to $\alpha^2$ $(n+\kappa)-n$.

12. The system of claim 11, wherein the at least one control unit operates the weighting of initial mean $$W_m^0$$

using a mathematical combination of the composite scaling parameter $\lambda$ and the state dimension n.

13. The system of claim 11, wherein the at least one control unit operates the weighting of initial covariance $$W_c^0$$

using a mathematical combination of the composite scaling parameter $\lambda$ and the state dimension n and the spread of sigma points $\alpha$ and prior knowledge of distribution $\beta$.

14. The system of claim 10, wherein the at least one control unit operates the prediction by: propagating sigma points through a state transition function; calculating a predicted state mean $\hat{x}_{k+1|k}$; and then calculating a predicted state variance $P_{k+1|k}$.

15. The system of claim 10, wherein the Kalman gain $K_{k+1}$ is calculated from a combination of a cross correlation matrix $P_{xz}$ and an innovation covariance $P_{zz}$, both terms themselves calculated from a propagation of sigma points generated in the prediction through a measurement function.

16. The system of claim 1, wherein the at least one control unit is configured to apply a pre-process to the PDPs before further processing.

17. The system of claim 16, wherein the at least one control unit is configured to operate a pre-process wherein valid measurements are identified according to presence of NaN delay values.

18. The system of claim 16, wherein the at least one control unit is configured to calculate power for each tap from raw data received and generate therefrom decibel (dB) values.

19. The system of claim 18, wherein the at least one control unit is configured to filter out taps below a set threshold $P_{min}$.

20. The system of claim 19, wherein $P_{min}$ is between $-14$ and $-7$ dB inclusive, wherein 0 dB is defined by the at least one control unit as a baseline noise level of the receiver.

21. The system of claim 1, wherein the at least one control unit is a plurality of control units associated with a plurality of receivers.

22. The system of claim 21, wherein each receiver is installed with its own control unit, and wherein the at least one control unit is configured to combine data from part or all of the plurality of control units periodically and process the combined data.

23. The system of claim 1, wherein the transmitter is also configured to receive signals, and the at least one receiver is configured to transmit signals.

24. The system of claim 1, wherein the at least one control unit determines tap delay and tap power change vs. baseline delay and power as a function of electromagnetic diffusion speed difference in different materials.

25. The system of claim 1 wherein the at least one control unit determines noise profile change with respect to baseline delay and power of at least one tap in order to evaluate interfering object movement properties.

* * * * *